United States Patent Office 3,463,749
Patented Aug. 26, 1969

3,463,749
CURABLE COMPOSITION CONTAINING EPOXY AND VINYL MODIFIED POLYESTER
David D. Taft, 7233 Monardo Lane,
Minneapolis, Minn. 55435
No Drawing. Continuation-in-part of application Ser. No. 527,093, Feb. 14, 1966. This application Aug. 17, 1967, Ser. No. 661,189
Int. Cl. C08f 21/00; C08g 45/14
U.S. Cl. 260—22             17 Claims

ABSTRACT OF THE DISCLOSURE

Hard, flexible, mar-resistant films are obtained by mixing together a curable epoxy component and a vinyl-modified polyester. Preferably these two components are employed in a two-package system in which, when they are mixed together, they react to form the film-forming material.

DISCLOSURE

This application is a continuation-in-part of U.S. Ser. No. 527,093, filed Feb. 14, 1966, now abandoned.

The present invention relates to curable compositions containing both an epoxy component and a vinyl-modified polyester. In one aspect, this invention relates to a multiple-package coating system containing, in a first package, a curable epoxy component (e.g., epoxidized soybean oil) and, in a second package, a vinyl-modified polyester which serves as a curing agent for the epoxy component. When mixed together, the contents of these two packages are capable of forming hard, flexible, mar-resistant films on a variety of substrates (e.g. wood, metal, concrete, and the like).

Robert Boller and Dr. Richard B. Graver have jointly developed and described in U.S. Patent 3,218,274 (issued Nov. 16, 1965) a highly effective two-package coating composition. One of the two packages contained a curable epoxidized fatty compound, e.g., epoxidized soybean oil. The other package contained a polyester curing agent for the epoxidized fatty compound contained in the first package. At or about the time of use, the contents of the two packages were combined and the resulting mixture spread in film form on a suitable substrate (e.g., wood) and cured (e.g., by baking or air drying) to thereby provide a decorative or protective coating.

One significant advantage of a preferred embodiment of their two-package coating system has been its ability to co-react and harden at room temperature to form hard, mar-resistant, durable coatings. Cured films prepared from their two-package coating system have exhibited highly desirable properties in terms of (1) their non-yellowing tendency, (2) their gloss retentive properties, (3) their durability, (4) their ability to be applied by brushing, spraying or rolling on common substrates such as wood, concrete, and metal, and (5) the ease with which dirt and common stains can be removed. On concrete or earthenware their coating system can provide a glazed, ceramic-like appearance.

I have discovered that polyester curing agents of the type developed by Boller and Graver can be modified to improve certain properties (e.g., to improve the caustic resistance) of the cured films obtained therefrom. Additionally, I have discovered that by using my modified polyester curing agents, I am able to obtain useful films (both free and supported) by co-reaction with a wide variety of epoxy materials. While I generally prefer to employ epoxidized fatty compounds, e.g., epoxidized linseed oil, as the primary or sole epoxy component, I can also use other epoxidized compounds as part or all of the epoxy component. Thus my modified polyester curing agents have been successfully used in conjunction with bisphenol epichlorohydrin resins (e.g., Epon 828) as well as alicyclic diepoxides (e.g., Unox 201). Good results have been obtained using these non-fatty epoxidized compounds as the sole epoxy component.

THE MODIFIED POLYESTER CURING AGENT

According to my invention, polyester curing agents of the general type developed by Boller and Graver are first prepared using as a part of the ester-forming ingredients (1) a co-polymerizable polycarboxylic acid or anhydride containing ethylenic unsaturation (e.g., maleic acid or anhydride), or (2) a co-polymerizable polyhydric alcohol containing ethylenic unsaturation (e.g., diallyl ether of trimethylolpropane), or (3) an unsaturated fatty substance free of terminal unsaturation having more than 6 carbon atoms (e.g., unsaturated fatty acids of $C_6$–$C_{26}$ carbon atoms and their triglycerides such as myristic, palmitic, stearic, linoleic and the like acids and their triglycerides) or (4) any combination of the foregoing. Subsequent to the formation of the unsaturated polyester just described, it is co-polymerized (using conventional techniques) with from 5 to 300 weight percent, preferably from 5 to 100 weight percent, e.g., 10 to 60 weight percent, of a copolymerizable vinyl or ethylenic monomer such as an alkyl ester of an alpha beta unsaturated monocarboxylic acid, a vinyl aromatic compound or a mixture thereof, e.g. an ester of acrylic or methacrylic acid. The percentages just referred to are based on the weight of the unmodified polyester curing agent. Alternatively, a vinyl copolymer can first be prepared and then the esterification conducted in the presence of the copolymer and a polymerization catalyst. This is a less preferred technique. The resulting modified polyester curing agent can be viewed as an unsaturated polyester curing agent which has been modified by chemically bonding a vinyl polymer thereto. While not wishing to be bound to any theory, I believe that this vinyl tail, hanging from the polyester curing agent, in some way protects or screens ester linkages and thereby renders cured films obtained from this system more resistant to caustics and certain solvents.

The unmodified polyester curing agents are the simple esterification reaction products of polyhydric alcohols and polycarboxylic acids (or anhydrides) and, optionally, unsaturated fatty substances free of terminal unsaturation having more than 8 carbon atoms. The unmodified polyester curing agent can be viewed as a partial ester or as a carboxyl-terminated polyester having an average of at least two free carboxyl groups. I have found it convenient to think of the polyester curing agent as being a polyhydric alcohol having at least two hydroxyl groups esterified with polycarboxylic acid and, optionally, modified with a unsaturated fatty substance free of terminal unsaturation having more than 8 carbon atoms.

In its simplest form, the unmodified polyester curing agent can be viewed as: (polycarboxylic acid)-(polyhydric alcohol)-(polycarboxylic acid). Of course, the esterification reaction product may not be as simple as represented above. The esterification reaction may also yield some polymeric polyester, as well as some unreacted polycarboxylic acid and/or unreacted polyhydric alcohol. In any event, the predominant species is a simple alcohol-centered, partial ester or carboxyl-terminated polyester as represented above. This can be verified, in part, by a determination of number average molecular weight and infrared analysis. It should also be understood that more than two hydroxyl groups in a polyhydric alcohol can be esterified with polycarboxylic acid. For example, all three hydroxyl groups in trimethylolpropane can be esterified with chlorendic acid. Thus, the simple formula represented above should only be considered as illustrative of the type of material herein contemplated.

The esterification reaction product can also be represented by the structural formula:

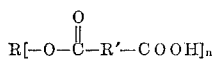

wherein $n$ is at least two (e.g., three or four),
R is the polyhydric alcohol residue, and
R′ is the polycarboxylic acid residue.

The esterification reaction product can also be viewed as the reaction product between an unsaturated fatty substance, polyhydric alcohols and polycarboxylic acids (or anhydrides).

Suitable polyhydric alcohols include ethylene glycol, propylene glycol, glycerol, trimethylol ethane, trimethylolpropane, sorbitol, penterythritol, dipentaerythritol, tripentaerythritol, and the like. Typically, these polyhydric alcohols will contain from 2–20, e.g., 3–15 carbon atoms and 2 or more, e.g., 3–8 hydroxyl groups. Mixtures of polyhydric alcohols can be employed. The saturated, aliphatic polyhydric alcohols, particularly those saturated, aliphatic polyhydric alcohols having 3 or more hydroxyl groups, are preferred. Pentaerythritol (pure or technical grade) is particularly preferred.

Since it is necessary to introduce a copolymerizable ethylenic bond into the unmodified polyester curing agent, all or a portion (e.g., 5 to 100 mole percent) of the polyhydric alcohol can be a vinyl polyhydric alcohol (or mixture thereof). The preferred unsaturated, copolymerizable polyhydric alcohols are the mono- and poly-allyl ethers of the common polyhydric alcohols just described. Such allyl ethers include the monoallyl ether of trimethylol propane, the mono-allyl ether of ethylene glycol the mono-allyl ethers of pentaerythritol, the mono-allyl ethers of sorbitan, the mono-allyl ethers of glycerol, the diallyl ethers of pentaerythritol, the tri-allyl ethers of mannitol, and the like. If desired, the alkyl-substituted (i. e., $C_1$–$C_6$ alkyl-substituted) allyl ethers can be used, e.g., ethallyl ethers, di-methyl allyl ethers, etc. Particularly preferred vinyl or unsaturated alcohols are the allyl ethers of polyhydric alcohols having at least 3 free hydroxyl groups (e.g., the mono-allyl ether of trimethylol propane).

The unsaturated copolymerizable double bond may also be incorporated by introducing into the unmodified polyester curing agent, an unsaturated fatty substance free of terminal unsaturation having greater than 8 carbon atoms (e.g., unsaturated fatty acids of 8–22 carbon atoms and their triglycerides such as myristic, palmitic, stearic, linoleic and the like acids and their triglycerides). Suitable fatty substances include safflower oil, soybean oil, linseed oil, tung oil, oiticia oil, and the like. Suitable unsaturated fatty substances include also soya fatty acids, safflower fatty acids, dehydrated castor oil fatty acids, linseed fatty acids, tall oil fatty acids, and the like. If the unsaturated fatty substance is a vegetable oil, then processing techniques known to the art may be employed, e.g. alcoholysis of the unsaturated vegetable oil with the polyhydric alcohols subsequent to the reaction with the polycarboxylic acids.

Suitable polycarboxylic acids include chlorendic acid (i.e., hexachloroendomethylene tetrahydrophthalic acid), maleic acid, trimellitic acid, tetrachlorophthalic acid, monochlorophthalic acid, tetrahydrophthalic acid, hexahydrophthalic acid, itaconic acid, citraconic acid, fumaric acid, and the like. The corresponding anhydrides can also be employed. Mixtures of polycarboxylic acids can be employed. The various phthalic acids and chlorendic acid are preferred. Chlorendic acid, alone or in combination with a phthalic acid (i. e., phthalic anhydride), is particularly preferred. When a co-polymerizable ethylenic bond is introduced into the unmodified polyester curing agent by means of an ethylenically unsaturated polycarboxylic acid, I prefer to use the unsaturated acid in conjunction with other polycarboxylic acids (e.g., use maleic acid or anhydride in conjunction with chlorendic acid and/or phthalic anhydride). Maleic acid (and its anhydride) is the preferred co-polymerizable, unsaturated acid. For purposes of this disclosure, I do not consider the benzene carboxylic acids (e.g., phthalic acid) to possess a co-polymerizable double bond.

In preparing the unmodified polyester curing agents of this invention, the esterification reaction mixture should initially contain (i.e. before any esterification takes place) a ratio of carboxyl to hydroxyl groups of from 1:1 to 3:1. Preferably, this ratio will be within the range of from 1.6:1 to 2.2:1, and even more preferably about 1.8 carboxyl groups for each hydroxyl group. The esterification reaction is conducted in the manner illustrated by the specific examples (hereinafter set forth) to preferably react most or all of the available hydroxyl groups. The resulting esterification reaction product should have an acid value of at least 50, and preferably of at least 100. Acid values over 140 (e.g., about 150 to 200) are especially desirable. When the alternative procedure of first forming the copolymer and then esterifying in the presence of the copolymer is employed, the unmodified polyester curing agents will not exist as such.

Regardless of the method used to form the modified polyester curing agents, they should have acid values of at least 30 and preferably above 50. Acid values above 70, e.g., from 70 to 180, are especially desirable.

The monomers employed for modifying the unsaturated curing agents are, as previously pointed out, the vinyl or ethylenic monomers such as alkyl esters of alpha, beta unsaturated monocarboxylic acids and vinyl aromatic compounds or mixtures thereof. Of these monomers the acrylics are prefered and suitable acrylic monomers for modifying the unsaturated polyester curing agents include the $C_1$–$C_{18}$ alkyl and $C_1$–$C_{18}$ alkoxy alkyl esters of acrylic and methacrylic acids. Use of the lower alkyl esters (e.g., methyl methacrylate) generally results in harder films, while the use of higher alkyl esters (e.g., lauryl methacrylate) provides more flexibility in the cured films. Examples of such acrylic monomers are methyl acrylate, ethyl acrylate, n-propyl acrylate, isopropyl acrylate, n-butyl acrylate, isobutyl acrylate, n-amyl acrylate, isoamyl acrylate, hexyl acrylate, 2-ethylhexyl acrylate, octyl acrylate, 3,5,5-trimethylhexyl acrylate, decyl acrylate, lauryl acrylate, dodecyl acrylate, cetyl acrylate, octadecyl acrylate, octadecenyl acrylate, ethyl methacrylate, n-propyl methacrylate, isopropyl methacrylate, butyl methacrylate, n-amyl methacrylate, sec.-amyl methacrylate, methyl methacrylate, 2-ethylhexyl methacrylate, octyl methacrylate, 3,5,5-trimethylhexyl methacrylate, decyl methacrylate, dodecyl methacrylate, octadecyl methacrylate, butoxyethyl acrylate, butoxyethyl methacrylate, other alkoxyalkyl acrylates or methacrylates, styrene, tertiary butyl styrene, vinyl toluene and the like. Mixtures of two or more of these monomers can be used, e.g., a mixture of ethyl acrylate and isobutyl acrylate. The $C_1$–$C_5$ alkyl esters of methacrylic acid (e.g., butyl methacrylate or methyl methacrylate) are the preferred esters.

In polymerizing the acrylic monomers, conventional polymerization techniques can be used. Common polymerization catalysts can be used. The polymerization catalyst will usually and preferably be one of the following: potassium persulfate, ammonium persulfate, azo-bis-isobutyronitrile, cumene peroxide, benzoyl peroxide, or di-tertiary butyl peroxide. Other suitable organic catalysts can be employed.

THE EPOXY COMPONENT

The epoxy component of this invention can be used (and usually will be) a curable, epoxidized fatty compound. Such fatty compounds include epoxidized fatty oils, epoxidized fatty acid esters of mono-hydric alcohols, epoxidized fatty acids esters of polyhydric alcohols, epoxidized fatty nitriles, epoxidized fatty amides, epoxidized fatty amines, epoxidized fatty alcohols and mixture thereof. Such epoxidized compounds are already well-known in the art. Typically, these epoxidized fatty compounds will have 8 to 26 carbon atoms (e.g., 12 to 22 carbon atoms) in the fatty radicals and will have an internal oxirane value of the epoxidized fatty compounds of at least 6%.

Preferred for use as the epoxy component of this invention are the curable epoxidized fatty esters. These epoxidized esters will generally contain from 8 to 26 carbon atoms (e.g., 12 to 22 carbon atoms) with internal oxirane groups in the fatty radicals and 1 to 10 carbon atoms in the mono- or polyhydric alcohol portion, with or without internal oxirane groups in the alcohol portion. Thus, the following esters are contemplated for use in this invention: epoxidized soybean oil; epoxidized linseed oil; epoxidized safflower oil; epoxidized 2-ethylhexyl tallate; epoxidized 1,5-pentanediol dioleate; epoxidized 1,2,6-hexanetriol dioleate mono-acetate; epoxidized methyl oleate; epoxidized glycerol trilinoleate; epoxidized glycerol trioleate; epoxidized glycerol mono-oleate; epoxidized glycerol monolinoleate; epoxidized monostearate dilinoleate; epoxidized esters of mono, di- or polypentaerythritol with soy, tall or linseed fatty acids; and the like. Several specific examples of epoxidized esters of fatty acids are listed below:

(a) Epoxidized soybean oil such as that sold under the trademark "Admex 710." Typically, this epoxided oil (a fatty triglyceride) will have an oxirane content of about 6%, a Gardner color of 1, a viscosity of about 5 stokes, and an iodine value of less than 5. Other epoxidized soybean oils sold commercially and containing varying percentages of oxirane oxygen (e.g., up to 7%) and iodine values as low as about 1 can be used.

(b) Epoxidized safflower oil having an oxirane value of about 7.4%.

(c) Epoxidized linseed oil having an oxirane value of about 9.0%.

(d) Epoxidized 2-ethylhexyl tallate. Typically, this material has the following characteristics: an acid value of 0.2, a Gardner color of 1, a viscosity of 0.5 stokes, a specific gravity of 0.923, and an oxirane content of 4.4%.

(e) Epoxidized 1,5-pentanediol dioleate. Typically, this material has the following characteristics: an acid value of 0.2, a Gardner color of 1, a viscosity of 1.1 stokes, a specific gravity of 0.945, and an oxirane content of 4.1%.

(f) Epoxidized 1,2,6-hexanetriol dioleate monoacetate. Typically, this material has the following characteristics; an acid value of 0.2, a Gardner color of 4, a specific gravity of 0.970, a viscosity of 2.3 stokes, and an oxirane content of 3.7%.

All epoxidized fatty compounds are not equally effective in practicing the present invention. While one can obtain benefits from my invention by using, for example a blend of epoxidized methyl oleate and 9,10-epoxy octadecanol, I much prefer to employ epoxidized fatty acid esters of saturated, aliphatic, polyhydric alcohols as the major epoxy component. Epoxidized glyceride oils (e.g., epoxidized linseed oil) are particularly preferred. For many ordinary uses, I recommend that at least 80 weight percent and preferably 90 weight percent or more (e.g., all) of the epoxy component be made up of the preferred epoxidized fatty esters. Especially preferred are the epoxidized fatty acid esters of polyhydric alcohols having 3 or more hydroxyl groups before esterification. The remainder of the epoxy component can be some other epoxidized fatty compound (e.g., epoxidized oleyl nitrile).

If desired, a portion or even all of the epoxy component can consist of non-fatty epoxidized compounds such as the bisphenol-epichlorohydrin resins or the various cyclic and acylic diepoxides. Thus, the epoxy component can comprise a material such as Epon 830, Epon 828, Unox 201, or the like. These non-fatty epoxidized compounds are employed when, according to an optional feature of this invention, an unsaturated fatty substance free of terminal unsaturation and having more than 8 carbon atoms is employed to modify the vinyl polyester, as previously mentioned and as specifically illustrated by Example 8.

The bisphenol-epichlorohydrin resins will usually have a molecular weight of from 350 to 1000 and contain terminal epoxide groups. Typically, they will have epoxide equivalents of 175 to 700, preferably 175 to 280. Suitable bisphenol-epichlorohydrin resins are the various Epons, e.g., 815, 820, 826, 828, 830, 834, etc.

Suitable monomeric diepoxides include 3,4-epoxy-6-methyl-cyclohexylmethyl-3,4-epoxy - 6 - methylcyclohexanecarboxylate (e.g., Unox 201), vinyl cyclohexene dioxide (e.g. Unox 206), alicyclic diepoxy acetals (e.g., Araldite CY–175), alicyclic diepoxy adipate (e.g., Araldite CY–178), etc.

Epoxidized compounds of different types and oxirane values can be blended together to obtain various properties, e.g., improved film resistance to yellowing, improved drying speed, and the like.

Under certain conditions, I have observed significant differences (in terms of the performance of the epoxy/polyester system) when epoxidized materials having internal oxirane are employed. Because of these differences in performance (e.g., as reflected by the speed of drying, hardness, tendency to yellow, and the like), as well as cost, I frequently employ an epoxidized fatty compound (or a mixture thereof) having internal oxirane as at least 80 weight percent and preferably 90 weight percent or more, of the epoxy component. However, for certain applications, other epoxy components are more effective (e.g., the alicyclic diepoxides).

USE OF THE EPOXY/MODIFIED POLYESTER SYSTEM

Typically, the epoxy component and the vinyl modified polyester curing agent are each diluted with solvent, frequently to a non-volatile content of 40 to 60 weight percent, and packaged separately. Suitable solvents include those solvents already well-known to the coatings art, e.g., xylene, toluene, Cellosolve acetate, butyl alcohol, ethyl benzene, mineral spirits, and the like.

At the time of use, the contents of the two packages (i.e., the epoxy components and the polyester component) are mixed together, usually in the ratio of 25 to 300 (e.g., 50 to 150) parts by weight of vinyl modified polyester curing agent per 100 parts by weight of epoxy component. This mixture can optionally include various pigments, fillers, extenders, dyes, driers, stabilizers, and the like, which can be included in one or both of the original packages. The mixture is then applied in film-form to a suitable substrate, e.g., wood, metal, etc. These wet films, which can range from 0.0005 inch up to 0.050 inch, more usually from 0.001 inch to 0.005 inch, are then cured. Curing can frequently be by air-drying at room temperature. Curing can be accelerated by baking. Partial pre-reaction of the components and catalysts can also be used to speed the curing or drying time.

Although these components will react at room temperature in the absence of air and/or catalysts, the ability of the two-package coating system to air dry at room temperature is improved by the use of chlorinated polycarboxylic acid in preparing the curing agent. Chlorendic acid is outstanding in this respect. Consequently, I prefer to use some chlorinated polycarboxylic acid (e.g., chlorendic acid) in preparing the vinyl modified curing agents of my invention whenever the ability to air dry at room temperature is required. Likewise, when baking applications are contemplated, I prefer to eliminate the chlorinated acid to thereby reduce costs and to improve the pot-life of the mixed coating.

When chlorinated acids have not been used and long-term storage stability is not desired, the epoxy component and the polyester component need not be kept separate, although I prefer to do so.

If free films are desired, the two components are mixed in the manner previously described and cast in film-form on a smooth surface. The wet film is then cured, e.g., by baking. The resulting cured film is then stripped or peeled from the underlying supporting surface. The cured film, when stripped from the underlying surface, is a flexible, thin, free film. In the absence of pigments or dyes, this free film is transparent and resembles polyethylene film in appearance.

The present invention will be further understood by reference to the following specific examples which include a preferred embodiment. Unless otherwise indicated, all parts and percentages are by weight.

AN EXAMPLE OF THE UNMODIFIED COPOLYMERIZABLE POLYESTER CURING AGENT

Example 1

250 parts of phthalic anhydride, 83 parts of maleic anhydride, 120 parts of pentaerythritol, and 30 parts of xylol, were charged to a reaction flask equipped with a stirrer, thermometer, water trap, and condenser. The mixture was esterified by heating it to 300° to 320° F. and holding it there for about 30 minutes. The esterification reaction product was reduced to 60% NV (i.e. 40% solvent and 60% non-volatile) using 115 parts xylol and 145 parts butanol. The viscosity of this solution was 11.2 stokes. The acid value of the polyester was 312 (corrected to 100% NV).

EXAMPLES OF VINYL MODIFIED POLYESTER CURING AGENTS

Example 2

30.4 parts of technical grade pentaerythritol, 14.7 parts of maleic anhydride, 322.5 parts of chlorendic acid, 26.8 parts of the mono-allyl ether of trimethylolpropane, and 317 parts of xylene were charged to a one-liter, three-necked, round-bottomed flask fitted with an agitator, nitrogen inlet, water trap, reflux condenser, and an addition funnel. The contents of the flask were then heated to 270° F. At this point, the xylene/water azeotrope began to distill. After esterification was substantially complete, 75 parts of butyl acrylate mixed with 3.7 parts of di-tertiarybutyl peroxide (as a catalyst) were slowly added to the esterification reaction product during a one-hour period. After continuing this reaction for three hours, the reaction mixture was cooled and then diluted with 70 parts of Cellosolve acetate. The viscosity of the cooled product was K on the Gardner-Holdt scale at a non-volatile (NV) level of 59.7%. The acid value of the vinyl modified polyester at 100% NV was 102.

Example 3

The procedure of Example 2 was repeated using 30.4 parts of technical grade pentaerythritol, 14.7 parts of maleic anhydride, 322.5 parts of chlorendic acid, 6.5 parts of the monoallyl ether of trimethylolpropane, 344 parts of xylene, 7 parts of ditertiary butyl peroxide, 75 parts of butyl methacrylate, and 75 parts of methyl methacrylate. The final non-volatile content (after dilution with 55 parts of Cellosolve acetate) was 58 percent.

Example 4

68 parts of xylene were heated to 227° F. in a one-liter, three-necked, round-bottomed flask fitted with an agitator, nitrogen inlet, water trap, and reflux condenser. The xylene was thoroughly sparged with nitrogen, and a solution of 3 parts of azo-bis-isobutyronitrile in 100 parts of ethyl acrylate was added during a one-half hour period. Next the reaction mixture was heated at 260° to 270° F. for one hour and then cooled to 90° F.

To the resulting homopolymer was added 33 parts of chlorendic acid, 30 parts of mono-pentaerythritol, 14.7 parts of maleic anhydride, 17.2 parts of the α-mono-allyl ether of glycerol, and 225 parts of xylene. This mixture was heated to 260° F. where water began to distill. After this mixture had been heated for four hours at 260° to 280° F., 15 parts of water had been collected. The mixture was cooled. The resulting product was 63.0% NV, had a viscosity of 32 stokes, and had an acid value of 77.2. When corrected to 100% NV, the acid value was 122.

Example 5

338 parts of chlorendic acid, 19.6 parts of maleic anhydride, 48 parts of mono-pentaerythritol, and 180 parts of xylene were heated to 284° F. and held at this temperature for two and one-half hours to esterify the mixture. When cooled to room temperature, the crude reaction product was a clear solution. The solution was reheated to 234° F. and the addition of a mixture of 75 parts of lauryl methacrylate and 4 parts of di-tertiarybutyl peroxide was started. After the monomer and catalyst were added (one hour), the reaction mixture was heated for four hours. The resulting product was 59.8% NV, had a viscosity of 278 stokes and an acid value of 70.2. When corrected to 100% NV, the acid value was 117.

Example 6

386.3 parts of chlorendic acid, 67.5 parts of technical grade pentaerythritol, 148 parts of phthalic anhydride, 34.8 parts of the mono-allyl ether of trimethylolpropane, and 265 parts of xylene were mixed in a two-liter, three-necked, round-bottomed flask fitted with a nitrogen inlet, thermometer, water trap, addition funnel, and reflux condenser. The mixture was sparged with nitrogen and then heated to 294° F., where water began to distill. After three and one-half hours, 14.5 parts of water had been collected. Then an additional 245 parts of xylene were added which caused the temperature to drop to 270° F. Then a mixture of 7 parts of di-tertiarybutyl peroxide and 150 parts of methyl methacrylate were added during a one hour period. This resulting mixture was then heated for three hours at 280° F. and then cooled to room temperature. The viscous, clear resin which resulted was reduced to a viscosity of D+ on the Gardner-Holdt scale by the addition of 10% by weight of n-butanol. The reduced resin solution was 60.7% NV and had an acid value of 72.3. When corrected to 100% NV, the acid value was 117.

Example 7

335 parts of chlorendic acid, 30 parts of mono-pentaerythritol, 14.7 parts of maleic anhydride, 21 parts of the mono-allyl ether of trimethylolpropane, and 160 parts of xylol were mixed in a one-liter, three-necked, round-bottomed flask fitted with a nitrogen inlet, agitator, water trap, and reflux condenser. The mixture was heated to 300° F. and held at this temperature until 16.5 parts of water had been collected. To the reaction mixture were then added 200 parts of xylol and 92 parts of n-butanol. Next, a mixture of 7 parts of di-tertiarybutyl peroxide and 150 parts of ethyl methacrylate was added at 235° F. over a one and one-half hour period. The resulting mixture was then heated for two hours and cooled. The final product was 58.1% NV and had an acid value of 46.3. The viscosity was 4.5 stokes. When corrected to 100% NV, the acid value was 80.

EXAMPLE OF PREPARATION AND USE OF OIL MODIFIED VINYL MODIFIED POLYESTER CURING AGENT

Example 8

220 parts of conjugated safflower oil, 37 parts of mono-pentaerythritol were transesterified at 495° C. for two hours and cooled to room temperature. 143 parts of xylene were then added and the reaction mixture heated at 270° to 276° F. while a solution of 3 parts of di-tertiarybutyl peroxide in 75 parts of methyl methacrylate was added over a period of one hour, after which the reaction mixture was heated an additional hour. 394 parts of chlorendic acid were then added and a xylol-filled water trap attached to the closed vessel which was maintained at 272° to 282° F. for two and one-quarter hours. During this time, 12.75 parts of water were collected. The resultant modified copolymer was found to have a viscosity of 64 stokes and an acid value of 81.5.

EXAMPLES OF COATINGS PREPARED FROM THE EPOXY/VINYL MODIFIED POLYESTER SYSTEM

The vinyl modified polyesters of Examples 2–7 were mixed with various epoxy components and used to form coatings (on glass plate) and free films (stripped from a polypropylene substrate). The compositions of the mixtures and the film properties obtained therewith are shown in Table I which follows:

prepared vinyl polymer. By this procedure, it is possible to form the unmodified polyester and modify it simultaneously. All of the coatings of these selected examples had excellent caustic resistance. Except for Examples 12 and 14, all of the coatings cured by air drying at room temperature had a high degree of flexibility and adhesion.

One run (not illustrated in Table I) was made like Example 12, but using only 3 parts of Unox 201. This small amount of epoxide was sufficient to form a hard coating by air drying at room temperature (Sward hardness of 16 after sixteen hours). However, the coatings did not have the high caustic resistance of the coatings of Example 12, presumably because of the large number of unreacted carboxyl groups.

The caustic resistance of the coatings of Example 17

TABLE I [1]

| Example number | 9 | 10 | 11 | 12 | 13 | 14 | 15 |
|---|---|---|---|---|---|---|---|
| Parts of modified polyester of example | 37 of #2 | 31 of #3 | 30 of #4 | 30 of #4 | 30 of #4 | 32 of #4 | 30 of #4 |
| Parts of 90% NV solution of a mixture of epoxidized soybean oil and epoxidized linseed oil with 6+% internal oxirane (average) | 16.5 | 18 | 20 | | 10 | 5 | |
| Parts of Unox 201 | | | | | 20 | | |
| Parts of Unox 206 | | | | 20 | 10 | | |
| Parts of Epon 820 | | | | | | 15 | 20 |
| Sward hardness of coatings: | | | | | | | |
| (a) Baking at 250° F. for 20 min | 50 | 34 | 20 | | 36 | 46 | 62 |
| (b) Air dry at room temperature, 16 hours | | 20 | 6 | 14 | 14 | 16 | 2 |
| (c) Air dry at room temperature, 24 hours | | | | | | | |
| (d) Air dry at room temperature, 45 hours | | | | | | | |
| (e) Air dry at room temperature, 60 hours | | | 20 | 24 | 24 | 24 | 6 |
| Resistance to 5% aqueous sodium hydroxide on 15 min. contact | Excellent | Excellent | Excellent | Excellent | Excellent | Excellent | Excellent |
| Tensile strength [2] of free films, p.s.i. | | | | | 5,880 | | |
| Percent elongation at rupture | | | | | 3.5 | | |

[1] All wet films were 0.003 inch.
[2] Instrom Tester at crosshead speed of 0.5 inch/min. over 2 inch span; all free films baked at 250° F. for 20 min.

| Example number | 16 | 17 | 18 | 19 | 20 | 21 |
|---|---|---|---|---|---|---|
| Parts of modified polyester of example | 35 of #4 | [3] 30 of #5 | 36.2 of #6 | 36 of #7 | 36 of #7 | 36 of #7 |
| Parts of 90% NV solution of a mixture of epoxidized soybean oil and epoxidized linseed oil with 6+% internal oxirane (average) | 9 | | 20 | 10 | 17 | 20 |
| Parts of Unox 201 | | 20 | | 10 | 3 | |
| Parts of Unox 206 | | | | | | |
| Parts of Epon 820 | 12 | | | | | |
| Sward hardness of coatings: | | | | | | |
| (a) Baking at 250° F. for 20 min | 32 | 60 | 24 | 34 | 20 | 20 |
| (b) Air dry at room temperature, 16 hours | 4 | | | | | |
| (c) Air dry at room temperature, 24 hours | | 32 | | 8 | 6 | 4 |
| (d) Air dry at room temperature, 45 hours | | 44 | 8 | 12 | 10 | 6 |
| (e) Air dry at room temperature, 60 hours | 14 | | | | | |
| Resistance to 5% aqueous sodium hydroxide on 15 min. contact | Excellent | Excellent | Excellent | Excellent | Excellent | Excellent |
| Tensile strength [2] of free films, p.s.i. | | | | | 1,320 | 330 |
| Percent elongation at rupture | | | | | 21 | 56.5 |

[3] Ten parts of xylene were added before mixing the polyester with the epoxy.

Referring now to the examples and data of Table I, the following additional comments are offered.

The baked coating of Example 9 was glossy, flexible and extremely mar-resistant. No whitening of the film and no significant loss of adhesion were observed during the simple caustic resistance test. By comparison, an unmodified polyester curing agent prepared from phthalic anhydride, chlorendic acid, and pentaerythritol was used in the same manner to form a cured film. This unmodified polyester had an acid value (calculated on the basis of 100% solids) of approximately 170. A clear, hard, glossy film was obtained. However, this film was much weaker in its resistance to the 5% caustic solution. After only 15 minutes contact with the caustic, considerable whitening of the otherwise clear film was observed and some loss of adhesion was noted.

The baked coating of Example 10 was flexible and mar-resistant. Both the baked and air-dried coatings had excellent caustic resistance. No whitening or significant loss of adhesion were observed during the caustic resistance test.

The coating systems of Examples 11–16 were based on the modified polyester of Example 4. Note that in Example 4 the modified polyester was prepared by reacting the ester forming ingredients (i.e., the polycarboxylic acid and polyhydric alcohol) in the presence of a previously was excellent, even after twenty minutes contact with 5% caustic. Adhesion was not as good as that obtained in, for example, Example 11.

The baked coating of Example 18 was clear and glossy.

The coatings of Examples 19–21 had excellent caustic resistance, even after twenty minutes contact with 5% caustic. The coatings of Example 19 were less flexible than those of Examples 20 and 21 which were very flexible.

From the foregoing examples and description it should be clear that the modified polyesters of the present invention can be used to cure a variety of epoxidized components. By varying the amounts and types of the various reactants and components it is possible to obtain a wide variety of properties. For example, coatings ranging from soft, flexible primers to hard, mar-resistant finishes can be obtained. These and similar epoxy/polyester systems can be used to form free films, as caulking compounds, casting resins, laminating resins, adhesives, etc. If desired, the modified polyesters can be blended with other compatible epoxy curing agents. Especially useful coating compositions can be prepared using, as the epoxy curing agent, a blend (in any proportions) of the modified polyester curing agents with the unmodified polyesters of Boller and Graver.

Although the present invention has been described with a certain degree of particularity, it will be realized that

What is claimed is:

1. A composition of matter comprising an organic solvent containing dissolved therein a modified polyester having an acid value of at least 80, said modified polyester being the copolymer of:
   (a) ethylenically unsaturated polyester having an acid value of at least 100; said polyester being selected from the group consisting of:
      (1) the esterification reaction product of a polyhydric alcohol and a polycarboxylic acid, and
      (2) the esterification reaction product of a polyhydric alcohol and polycarboxylic acid and an unsaturated fatty substance free of terminal unsaturation and having more than 8 carbon atoms, wherein the ratio of carboxyl groups to hydroxyl groups before esterification was from 1:1 to 3:1; and
   (b) from 5% to 300%, based on the weight of said unsaturated polyester, of polymerizable ester of a polymerizable vinyl or ethylenic monomer selected from the group consisting of an alkyl ester of an alpha, beta-unsaturated monocarboxylic acid, a vinyl aromatic compound and mixtures thereof.

2. The composition of claim 1 wherein said polymerizable ester is a $C_1$–$C_{18}$ alkyl or $C_1$–$C_{18}$ alkoxyalkyl ester of acrylic or methacrylic acid, or a mixture of such esters.

3. Composition of claim 2 wherein:
   (a) the modified polyester has an acid value of 80–180;
   (b) said polyhydric alcohol comprises pentaerythritol;
   (c) said polycarboxylic acid comprises chlorendic acid;
   (d) the ratio of carboxyl groups to hydroxyl groups is from 1.6:1 to 2.2:1; and
   (e) said copolymer contains from 10% to 60% of said polymerizable ester based on the weight of said unsaturated polyester.

4. The composition of claim 1 wherein said polyhydric alcohol comprises an allyl ether of a saturated aliphatic $C_2$–$C_{20}$ polyhydric alcohol.

5. Composition of claim 4 wherein:
   (a) said ratio of carboxyl groups to hydroxyl groups is from 1.6:1 to 2.2:1;
   (b) said polycarboxylic acid comprises chlorendic acid or its anhydride; and
   (c) said polymerizable ester comprises $C_1$–$C_5$ alkyl ester of methacrylic acid.

6. Composition of claim 1 wherein said polycarboxylic acid comprises maleic acid or its anhydride.

7. Composition of claim 1 wherein the ethylenically unsaturated polyester having an acid value of at least 100 is the esterification reaction product of a polyhydric alcohol and polycarboxylic acid and an unsaturated fatty substance free of terminal unsaturation and having more than 8 carbon atoms wherein the ratio of carboxyl groups to hydroxyl groups before esterification was from 1:1 to 3:1.

8. Composition of matter comprising an organic solvent solution of a polyester having an acid value of at least 80, said modified polyester being the copolymer of:
   (a) polyhydric alcohol;
   (b) polycarboxylic acid; and
   (c) polymerized ester of acrylic or methacrylic acid, or a polymerized mixture of such esters;
   (d) wherein the ratio of carboxyl groups in said polycarboxylic acid to hydroxyl groups in said polyhydric alcohol is from 1:1 to 3:1;
   (e) wherein at least one of the groups consisting of polyhydric alcohol and polycarboxylic acid comprises copolymerizable ethylenically unsaturated polyhydric alcohol or copolymerizable ethylenically unsaturated polycarboxylic acid; and
   (f) wherein said modified polyester contains about 5 to 75 weight percent of said polymerized ester based on the weight of modified polyester.

9. Composition of claim 8 wherein:
   (a) said polyhydric alcohol is a mixture comprising pentaerythritol and an allyl ether of a polyhydric alcohol having at least three hydroxyl groups, said mixture containing from 40–90 mole percent saturated polyhydric alcohol;
   (b) said polycarboxylic acid is a mixture comprising maleic anhydride and chlorendic acid; and
   (c) said polymerized ester is a polymer of $C_1$–$C_{18}$ alkyl ester of acrylic or methacrylic acid, or a polymer of a mixture of such esters.

10. A composition comprising:
    (I) a curable epoxidized compound; and
    (II) a modified polyester having an acid value of at least 30, said modified polyester being the copolymer of:
       (a) ethylenically unsaturated polyester having an acid value of at least 50; said polyester being selected from the group consisting of:
          (1) the esterification reaction product of a polyhydric alcohol and polycarboxylic acid, and
          (2) the esterification reaction product of a polyhydric alcohol and polycarboxylic acid and an unsaturated fatty substance free of terminal unsaturation and having more than 8 carbon atoms, wherein the ratio of carboxyl groups to hydroxyl groups before esterification was from 1:1 to 3:1; and
       (b) from 5% to 300%, based on the weight of said unsaturated polyester of polymerizable ester of a polymerizable vinyl or ethylenic monomer selected from the group consisting of an alyky ester of an alpha, beta-unsaturated monocarboxylic acid, a vinyl aromatic compound and mixture thereof.

11. A coating composition comprising an organic solvent solution of:
    (I) a curable epoxidized compound
    (II) the modified polyester composition of claim 7.

12. A coating composition of claim 11 wherein said epoxidized compound is bisphenol-epichlorohydrin resin having an epoxide equivalent of 175–280.

13. A coating composition capable of forming air dried coatings at room temperature comprising an organic solvent solution of:
    (I) an epoxy component consisting of at least 80% by weight of epoxidized fatty acid esters of a polyhydric alcohol having at least three hydroxyl groups before esterification, said epoxidized fatty acid ester having 8 to 26 carbon atoms in its fatty radicals and an internal oxirane value of 3% to 10%, and
    (II) the modified polyester composition of claim 3.

14. Coating composition comprising an organic solvent solution of the composition of claim 10 wherein said epoxidized fatty acid ester comprises epoxidized linseed oil having an oxirane value of at least 6%.

15. Substrate coated with the cured film obtained by curing on said substrate, a mixture of the coating system of claim 10.

16. Substrate coated with the cured film obtained by curing on said substrate a mixture of the coating composition of claim 11.

17. Substrate coated with the cured film obtained by curing on said substrate, a pigmented mixture of the coating composition of claim 13, said curing being accomplished by air drying at room temperature.

References Cited

UNITED STATES PATENTS 2,537,949   1/1951   Adams _____ 260—22

(Other references on following page)

UNITED STATES PATENTS

| | | | |
|---|---|---|---|
| 2,647,092 | 7/1953 | Meeske et al. | 260—22 |
| 2,852,487 | 9/1958 | Maker | 260—861 |
| 3,218,274 | 11/1965 | Boller et al. | 260—22 |
| 3,258,438 | 6/1966 | Shaw et al. | 260—22 |
| 3,267,176 | 8/1966 | Mahlman | 260—22 |
| 3,287,293 | 11/1966 | Dalibor | 260—22 |

DONALD E. CZAJA, Primary Examiner

R. W. GRIFFIN, Assistant Examiner

U.S. Cl. X.R.

117—124, 132, 134, 148, 161, 167; 260—23, 33.2, 33.4, 33.6, 835, 861, 869, 872

UNITED STATES PATENT OFFICE
CERTIFICATE OF CORRECTION

Patent No. 3,463,749　　　　　　　　　Dated August 26, 1969

Inventor(s)　　David D. Taft

It is certified that error appears in the above-identified patent and that said Letters Patent are hereby corrected as shown below:

Column 4, line 70, after can be, delete "used". Column 7, line 56, delete "6.5" and insert --26.5--.

Signed and sealed this 17th day of August 1971.

(SEAL)
Attest:

EDWARD M. FLETCHER, JR.　　　　　　WILLIAM E. SCHUYLER, JR.
Attesting Officer　　　　　　　　　　Commissioner of Patents